(12) United States Patent
Pirard et al.

(10) Patent No.: US 8,597,587 B2
(45) Date of Patent: Dec. 3, 2013

(54) METHOD AND INSTALLATION FOR THE MANUFACTURE OF CARBON NANOTUBES

(75) Inventors: Jean-Paul Pirard, Chenee (BE); Christophe Bossuot, Villeneuve Au Chemin (FR); Patrick Kreit, Grivegnee (BE)

(73) Assignee: Universite de Liege, Interface Entreprises-Universite, Angleur (BE)

( * ) Notice: Subject to any disclaimer, the term of this patent is extended or adjusted under 35 U.S.C. 154(b) by 3 days.

(21) Appl. No.: 13/489,171

(22) Filed: Jun. 5, 2012

(65) Prior Publication Data

US 2012/0269696 A1 Oct. 25, 2012

Related U.S. Application Data

(63) Continuation of application No. 11/196,736, filed on Aug. 4, 2005, now Pat. No. 8,241,602, which is a continuation of application No. PCT/EP2004/000952, filed on Jan. 28, 2004.

(30) Foreign Application Priority Data

Feb. 5, 2003 (EP) .................................... 03075349

(51) Int. Cl.
*B01J 19/00* (2006.01)
*B01J 19/02* (2006.01)
*B01J 8/10* (2006.01)

(52) U.S. Cl.
USPC ..................... 422/209; 423/447.3; 423/447.1; 977/842; 977/843; 422/198

(58) Field of Classification Search
USPC ............ 422/219–220, 198; 423/447.1–447.3, 423/445 B; 977/742–754, 842–848
See application file for complete search history.

(56) References Cited

U.S. PATENT DOCUMENTS

| 2,388,642 | A | * | 11/1945 | Ostergaard | ................... 196/112 |
| 2,550,948 | A | | 5/1951 | Tusson | |
| 3,688,992 | A | | 9/1972 | Schallis | |
| 4,244,705 | A | * | 1/1981 | Seidl et al. | ....................... 48/77 |
| 4,482,687 | A | | 11/1984 | Noshay et al. | |

(Continued)

FOREIGN PATENT DOCUMENTS

| EP | 0 451 323 A2 | 10/1991 |
| EP | 1 310 300 A1 | 5/2003 |

(Continued)

OTHER PUBLICATIONS

J.W. Seo et al.; Synthesis and Manipulation of Carbon Nanotubes; New Journal of Physics; 2003; 22 pages; IOP Publishing Ltd. and Deutsche Physikalische Gesellschaft.

(Continued)

*Primary Examiner* — Daniel C McCracken
(74) *Attorney, Agent, or Firm* — Reinhart Boerner Van Deuren P.C.

(57) ABSTRACT

Method for the manufacture of carbon nanotubes by thermal decomposition of at least one gaseous hydrocarbon (14) in the presence of a solid catalyst in a reactor (4) into which the catalyst is introduced via an inlet lock chamber (17) flushed by an inert gas (21, 22, 25, 26) and from which the carbon nanotubes are withdrawn via an outlet lock chamber (37) which is flushed with a flow of inert gas (39, 40).

17 Claims, 2 Drawing Sheets

(56) References Cited

U.S. PATENT DOCUMENTS

| | | | |
|---|---|---|---|
| 5,102,647 | A | 4/1992 | Yamada et al. |
| 5,240,683 | A * | 8/1993 | Maurel et al. ............... 422/135 |
| 6,333,016 | B1 | 12/2001 | Resasco et al. |
| 6,405,663 | B1 | 6/2002 | Jones |
| 2001/0048908 | A1 * | 12/2001 | Zehe et al. ............... 422/242 |
| 2002/0131910 | A1 | 9/2002 | Resasco et al. |
| 2003/0007919 | A1 | 1/2003 | Sakamoto et al. |
| 2006/0099134 | A1 | 5/2006 | Maruyama et al. |
| 2007/0025906 | A1 | 2/2007 | Pirard et al. |

FOREIGN PATENT DOCUMENTS

| | | |
|---|---|---|
| EP | 1 375 424 A1 | 1/2004 |
| GB | 2 307 233 A | 5/1997 |
| JP | 2003 252613 A | 9/2003 |
| KR | 2002 025 101 A | 4/2002 |
| WO | WO 90/07023 A1 | 6/1990 |
| WO | WO 01/94260 A1 | 12/2001 |
| WO | WO 03/056078 A1 | 7/2003 |
| WO | WO 2004/004956 A1 | 1/2004 |
| WO | WO 2004/007362 A1 | 1/2004 |
| WO | WO 2005/052229 A2 | 6/2005 |

OTHER PUBLICATIONS

E. Couteau et al.; CVD Synthesis of High-purity Multiwalled Carbon Nanotubes Using $CaCO_3$ Catalyst Support for Large-scale Production; Chemical Physics Letters 378; 2003; 9 pages.

H.M. Cheng et al.; Large-scale and Low-cost Synthesis of Single-walled Carbon Nanotubes by the Catalytic Pyrolysis of Hydrocarbons; Applied Physics Letters; Jun. 22, 1998; 3 pages; vol. 72, No. 25.

Hongjie Dai; Carbon Nanotubes: Opportunities and Challenges; Surface Science 500; 2002; 24 pages.

J.-F. Colomer et al.; Large-scale Synthesis of Single-wall Carbon Nanotubes by Catalytic Chemical Vapor Deposition (CCVD) Method; Chemical Physics Letters 317; 2000; 8 pages.

Sumio Iijima; Helical Microtubules of Graphitic Carbon; Nature; Nov. 7, 1991; 3 pages; vol. 354.

T.W. Ebbesen et al.; Large-scale Synthesis of Carbon Nanotubes; Nature; Jul. 16, 1992; 3 pages; vol. 358.

Perry's Chemical Engineers' Handbook Seventh Edition, Section 26, p. 7; 1997; 4 pages; McGraw-Hill.

Memorandum Dated Nov. 17, 2009, from Andrew H. Hirschfeld, Acting Associate Commissioner for Patent Examination.

* cited by examiner

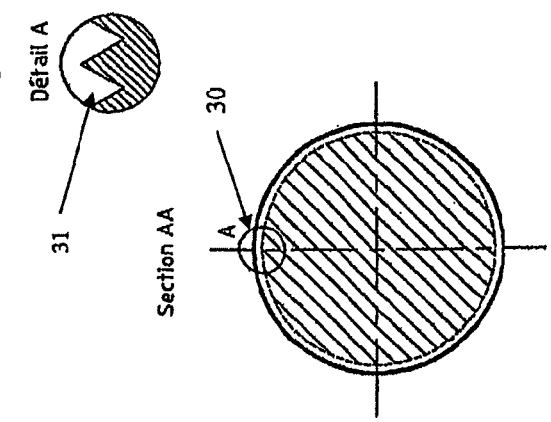
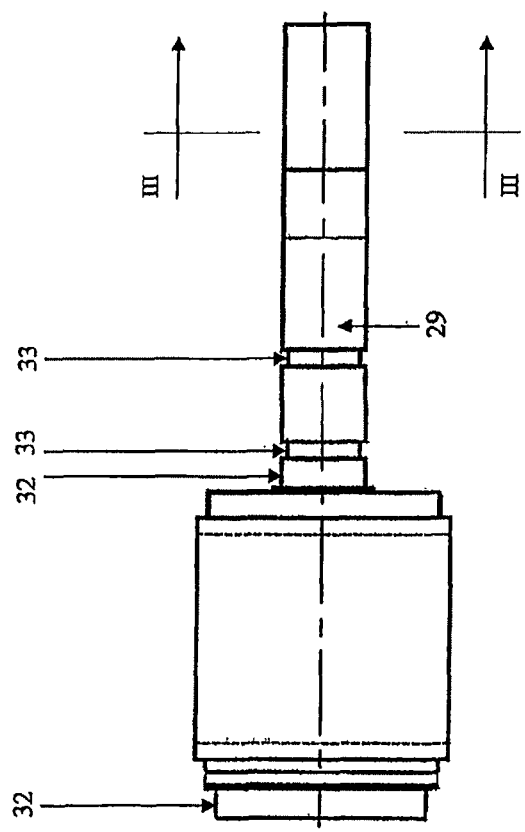

METHOD AND INSTALLATION FOR THE MANUFACTURE OF CARBON NANOTUBES

FIELD OF THE INVENTION

The invention relates to the manufacture of carbon nanotubes.

BACKGROUND

Carbon nanotubes are well known in technology. They consist, in general, of extremely fine tubular filaments made of pure carbon. Their diameter is a few nanometres and their length may reach several hundreds of nanometres, or approach or even exceed a micrometre.

At present there are three principal methods for synthesising carbon nanotubes: the laser carbon ablation method, the discharge of an electric arc on a graphite electrode and the chemical decomposition of a hydrocarbon in the vapour phase, also called the CCVD method (CCVD being an abbreviation for Catalyst Chemical Vapour Decomposition).

The CCVD synthesis method has the advantage of being inexpensive and of producing nanotubes with satisfactory carbon yields. According to this known method a hydrocarbon (for example, ethylene) is decomposed in the gaseous state at high temperature (of the order of 1000° C.) in the presence of a catalyst and the carbon nanotubes (which may be accompanied by soot and impurities), the catalyst, hydrogen, the hydrocarbon fraction which has not been decomposed and, in some cases, heavier hydrocarbons (for example, ethane if the hydrocarbon subjected to catalytic decomposition is ethylene) and odoriferous constituents are recovered from the synthesis reactor.

With the CCVD method of synthesis it is essential to avoid the presence of air in the synthesis reactor, to prevent the formation of explosive mixtures with the hydrocarbon or hydrogen produced. To this end, in a known implementation of the CCVD method, use is made of a tubular quartz reactor of the fixed-bed type at the centre of which is arranged a quartz receptacle containing a charge of catalyst (Chemical Physics Letters 317 (2000) pages 83 to 89: "Large-scale synthesis of single-wall carbon nanotubes by catalytic chemical vapor deposition (CCVD) method", J.-F. Colomer et al.). This known implementation of the CCVD method implies the following operations in order of execution:

placing of the installation under inert atmosphere;
opening of the reactor to insert a receptacle containing fresh catalyst;
placing of the installation under inert atmosphere;
feeding of the reactor with hydrocarbon in an inert gas;
placing of the installation under inert atmosphere;
withdrawal of the receptacle with the catalyst and the raw synthesis product from the reactor.

This known implementation of the CCVD method is discontinuous, which constitutes a disadvantage and is detrimental to the productivity of the synthesis reactor. It has the additional disadvantage of introducing the fresh catalyst into the reactor under inert gas at the high reaction temperature, whereas the catalysts used are deactivated under these conditions. The degree of deactivation of the catalyst is greater in that the time necessary to purge the installation and place it under inert atmosphere, after having introduced the fresh catalyst, is long.

To reduce the degree of deactivation of the catalyst it has been proposed to increase the length of the synthesis reactor in such a way that it has an upstream portion housed in an oven and a downstream portion in ambient air. The hydrocarbon and its carrier gas are introduced into the upstream portion of the reactor and the fresh catalyst is introduced into the downstream portion of the reactor. In this way the reactive gas is cooled in the downstream portion of the reactor and reaches the middle of the reactor at ambient temperature. In this case the reactor can be opened under reactive atmosphere to withdraw the receptacle charged with raw synthesis product and insert another receptacle with the fresh catalyst without excessive risk. This known variant of the CCVD method has the advantage of being faster, since the purgings with inert gas are no longer necessary. However, it does present a non-negligible hazard of explosion since non-negligible quantities of hydrocarbon and hydrogen are brought into contact with ambient air. In addition, partial deactivation of the catalyst upon contact with the reactive gases before reaching the reaction temperature is not avoided. Furthermore, because of the thermal inertia of the quartz receptacle/catalyst assembly, the catalyst requires a non-negligible time to reach the reaction temperature after being introduced into the hot portion of the reactor, further increasing its premature deactivation.

SUMMARY OF THE INVENTION

It is the object of the invention to eliminate the above-mentioned disadvantages of the known methods of implementing the CCVD synthesis method by providing a new method which has the advantage of being able to be operated continuously, which permits higher yields and which avoids all danger of explosion.

Consequently, the invention relates to a method for the manufacture of carbon nanotubes by thermal decomposition of at least one gaseous hydrocarbon in the presence of a solid catalyst in a reactor, the method being characterised in that the hydrocarbon is introduced continuously into the reactor, the catalyst is introduced continuously into the reactor by means of an insertion device at least a part of which is maintained under an inert atmosphere, and the carbon nano tubes are withdrawn from the reactor by means of a withdrawal device at least a part of which in subjected to flushing with a flow of inert gas.

The method according to the invention is based on the catalytic decomposition of a hydrocarbon into carbon and hydrogen. The synthesis is effected at high temperature in the presence of an appropriate catalyst, so that the carbon is synthesised in the state of crystals of graphite and has the morphology of nanotubes.

The carbon nanotubes obtained by means of the method according to the invention are extremely fine tubular filaments made of pure graphitic carbon and are as ordered as crystals. Their external and internal diameters are of a few nanometres (for example, from 4 to 50 urn for the external diameter and from 1 to 30 rum for the internal diameter) and their length may reach several hundreds of nanometres, or even several micrometres. The filament is generally formed by a graphite foil rolled on itself in a helicoidal spiral. Under the operating conditions employed in the course of synthesis, single-wall nanotubes (in which the helicoidal spiral foil forming the wall of the filament comprises a single volution) and multi-wall nanotubes (in which the helicoidal spiral foil comprises a plurality of volutions, so that the nanotubes comprises a plurality of hollow cylinders nested one inside the other) are distinguished. The internal diameter of the nanotubes depends on various factors, in particular the operating conditions (temperature and pressure), and on the catalyst and hydrocarbon selected. Further information on carbon nanotubes can be found in the technical literature, in particular in the article "Helical microtubes of graphitic carbon" by T. W.

Ebbesen and P. M. Ajayan, Nature, Vol. 354, 7 Nov. 1991, pages 56-58, and in the article "Large-scale synthesis of carbon nanotubes", Nature, Vol. 358, 16 Jul. 1992, pages 220-222.

The hydrocarbon is advantageously selected from aliphatic hydrocarbons. It may comprise a saturated hydrocarbon, an unsaturated hydrocarbon, a mixture of saturated hydrocarbons, a mixture of unsaturated hydrocarbons or a mixture of at least one saturated hydrocarbon with at least one unsaturated hydrocarbon. Methane, ethylene and acetylene are well suited.

In the method according to the invention the hydrocarbon is used in the gaseous state and is decomposed by thermal means in the presence of a catalyst. The optimum temperature for the thermal decomposition depends on various parameters, in particular the hydrocarbon used, the catalyst selected and the pressure utilised in the synthesis reactor.

In addition, the choice of temperature is affected by the morphology desired for the carbon nanotubes, in particular their dimensions, and on whether it is desired to obtain single-wall or multi-wall nanotubes. The optimum temperature must therefore be determined in each particular case, for example, by means of a routine laboratory operation. In general, temperatures range from 500 to 1200° C. If the hydrocarbon utilised is methane, a temperature from 900 to 1050° C. is preferably employed. If ethylene is used, a temperature from 600 to 800° C. is advantageously chosen.

The function of the catalyst is to catalyse the decomposition of the hydrocarbon into carbon and hydrogen, the carbon being produced in the graphitic state with the morphology of nanotubes. The catalyst is not critical to the execution of the method according to the invention, any catalyst normally used in the known CCVD method being suitable.

The form of the reactor is not critical. It must be isolated from the ambient environment in such a way as to avoid the introduction of uncontrolled chemical substances thereto. It is generally gas-tight. A tubular reactor slightly inclined to the horizontal is normally used. However, the invention does not exclude the use of a different appropriate form for the reactor. Self-evidently, the reactor must be made of a material capable of withstanding the temperature, pressure and chemical environment utilised. A reactor made of quartz is advantageously used.

According to a first characteristic of the method according to the invention, the hydrocarbon is introduced continuously into the reactor. To this end use may be made of any appropriate means normally employed to introduce a gas continuously into a chemical reactor. An injection lance represents an appropriate means of introducing the hydrocarbon continuously into the reactor.

The hydrocarbon may be introduced as such into the reactor. In a variant, it may also be introduced by means of an inert carrier gas. Argon, nitrogen, helium and hydrogen are examples of carrier gases that can be used in this variant of the invention.

According to a second characteristic of the method according to the invention, the catalyst is introduced continuously into the reactor. To this end, in accordance with the invention, a device at least a part of which is maintained in an inert atmosphere is used for charging the reactor. Any known appropriate means may be used to maintain the charging device or a part thereof in inert atmosphere. An appropriate means consists in passing the catalyst through a lock chamber located upstream of the reactor and in producing an inert gaseous atmosphere in the lock chamber (the term "upstream" is defined in relation to the direction of circulation of the materials and of the products of synthesis in the reactor). To do this, after the catalyst has been introduced into the lock chamber the latter is purged of the air it contains by replacing it with the inert gas. The function of this purging is to prevent air from entering the reactor with the catalyst. The inert atmosphere is selected from gases which are not capable of reacting with the hydrocarbon in the reactor. Argon, nitrogen and helium are especially recommended.

According to the invention a preferred means of producing the inert atmosphere in the inlet lock chamber consists is subjecting the latter to flushing with the inert gas.

According to a third characteristic of the method according to the invention the carbon nanotubes are withdrawn from the reactor by means of a withdrawal device at least a part of which is subjected to flushing with a flow of inert gas. The function of the flushing of the withdrawal device with the inert gas flow is to entrain the gases issuing from the reaction (hydrogen, excess hydrocarbon) out of the withdrawal device. The inert gas used for flushing must therefore be inert with respect to carbon, hydrogen and the hydrocarbon used. Argon, nitrogen and helium are especially recommended. Any appropriate known method may be used to place and maintain the withdrawal device or a part thereof under inert atmosphere. An appropriate means consists in causing the carbon nanotubes to pass through a lock chamber located downstream of the reactor and to subject said lock chamber to flushing with the inert gas flow (the term "downstream" is defined in relation to the direction of circulation of the materials and of the products of synthesis in the reactor).

In a particular embodiment of the method according to the invention at least a portion of the reaction gas is extracted from the reactor. This embodiment of the invention allows the reaction gas to be analysed to monitor the correct execution of the method.

In the method according to the invention it is recommended that heating of the reactor is effected in such a manner as to avoid substantial heating of at least the part of the charging device in which an inert atmosphere is produced. In the case in which said part of the charging device includes a lock chamber, the latter is isolated from the heating of the reactor. Substantial heating of at least the part of the withdrawal device in which an inert atmosphere is produced is also avoided. In the case in which said part of the withdrawal device includes a lock chamber, the latter is isolated from the heating of the reactor.

The method according to the invention has the particular feature that the catalyst and the hydrocarbon are isolated from ambient air at the moment when they are introduced into the reactor. It has the additional particular feature that the carbon nanotubes are first isolated from ambient air at the moment of being withdrawn from the reactor and are then immersed in inert atmosphere before being brought into contact with ambient air. These particular features of the method according to the invention ensure the safety of the operators and of the reactor by eliminating any risk of explosion.

The method according to the invention has the advantage of avoiding premature overheating of the catalyst before it has entered the zone of the reactor in which synthesis takes place, thus avoiding a reduction in its catalytic activity. The method also allows the catalyst and the hydrocarbon to be introduced in the most appropriate zone in the reactor for producing an optimum synthesis and obtaining a product of optimum quality, with optimum yields from the point of view both of energy consumption and of utilisation of materials.

The method according to the invention has the advantageous feature of being continuous. Unlike the known method of CCVD synthesis, it does not necessitate discontinuous alternating operation of the steps of charging the reactor with materials and the steps of withdrawing the products of synthesis, separated by phases of placing the reactor under inert atmosphere. By comparison with the known discontinuous modes of synthesising carbon nanotubes, the method according to the invention achieves maximum productivity of the reactor at minimum cost.

The invention also relates to an installation suitable for the continuous production of carbon nanotubes by means of the method according to the invention. The installation according to the invention comprises a tubular reactor inclined to the horizontal, a device for admitting a gaseous reagent to the reactor, a device for charging the reactor with a pulverulent product, a device for withdrawing a powder from the reactor and a device for heating the reactor, the charging device including a lock chamber isolated by two valves and provided with connections to an inert gas circuit, and the withdrawal device including another lock chamber isolated by two valves and provided with connections to an inert gas circuit.

In the installation according to the invention the tubular reactor is designed to rotate about its longitudinal axis in the manner of cement plant furnaces. It must the isolated from the ambient atmosphere so as to prevent the ingress of uncontrolled chemical materials. It is generally gas-tight.

The heating device is normally located on the outside of the reactor and may include, for example, an oven heated electrically or by means of a fossil fuel. It may also include a jacket disposed around the tubular reactor through which a hot fluid passes.

In an advantageous embodiment of the installation according to the invention the heating device consists of an oven in which the tubular reactor is housed. The oven may be heated by any adequate means, for example, combustion of a fossil fuel (advantageously natural gas) or by electrical energy. In the embodiment of the installation according to the invention which has just been described the tubular reactor is made, for example, of quartz or of another inert and refractory material such as alumina or steel coated with a protective layer of a refractory material. It is preferably encased by a metal cylinder (for example, of steel) designed to increase its mechanical strength.

The function of the lock chambers is to keep the tubular reactor isolated from the external atmosphere during the introduction of the materials and the withdrawal of the products of synthesis. For this purpose they are provided with two isolating valves. One of the valves serves to isolate the lock chamber from the external atmosphere and the other is mounted on a conduit connecting the lock chamber to the reactor. The lock chambers are provided with connections to an inert gas circuit. The connections are generally two in number (although a larger number of connections is possible) and they are located so as to permit efficient flushing of the lock gate with inert gas.

In the installation according to the invention the charging device normally includes a distributor of pulverulent product designed to control the delivery of pulverulent product entering the reactor. The distributor may be, for example, of the spiral pump type.

When the installation according to the invention is utilised to carry out the method according to the invention the gas admission device serves to introduce the hydrocarbon into the reactor, the charging device serves to introduce the catalyst into the reactor, the withdrawal device serves to extract the products of synthesis from the reactor, the gas circuits of the lock gates are inert gas circuits and the heating device is designed to produce a temperature from 500 to 1200° C. in the interior of the reactor.

In a preferred embodiment of the installation according to the invention, which is well adapted to executing the method according to the invention, the reactor is in communication with a device for admitting a carrier gas for the hydrocarbon.

In another embodiment of the installation according to the invention the latter includes, in the downstream portion of the reactor, upstream of the lock chamber of the withdrawal device, a conduit for evacuating at least a portion of the reaction gases. This evacuation conduit is advantageously connected to a gas analyser. This gas analyser is not critical in itself. It advantageously includes a gas-phase chromatograph coupled to a mass spectrometer.

The installation according to the invention is advantageously computer-controlled.

The carbon nanotubes obtained by means of the method according to the invention have various applications, in particular in the manufacture of electronic circuits, for reinforcing materials and for gas storage.

BRIEF DESCRIPTION OF THE DRAWINGS

Particular features and details of the invention are exemplified in the following description of the appended drawings, in which:

FIG. 2 is a side view of a constructional element of the installation of FIG. 1;

FIG. 3 shows the constructional element of FIG. 2 in cross-section through the plane III-III of FIG. 2;

FIG. 4 shows a detail of FIG. 3 on a larger scale.

DETAILED DESCRIPTION OF THE DRAWINGS

Figure 1:
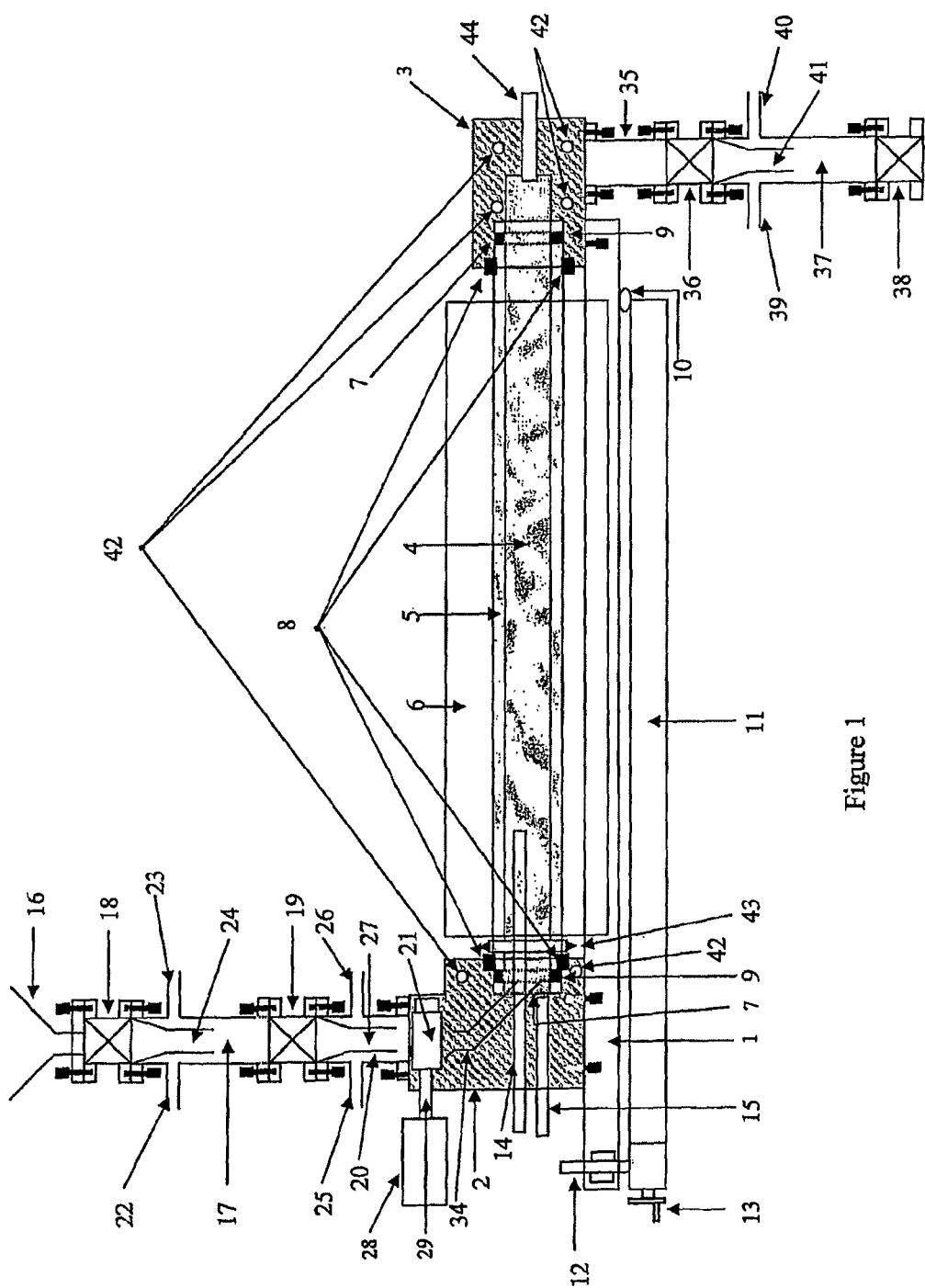
FIG. 1 shows schematically a particular embodiment of the installation according to the invention in an axial vertical section.

In the Figures the same reference numerals designate identical elements.

The installation shown schematically in FIG. 1 comprises a substantially horizontal beam 1 to which are fixed two metal blocks 2 and 3 (for example, of stainless steel). The blocks 2 and 3 serve to support a tubular reactor 4 of quartz encased by a cylinder 5 of stainless steel inside a tubular oven 6. The tubular reactor 4 and its casing 5 are supported in annular cavities 7 of the blocks 2 and 3 by means of rollers 8. O-rings 9 ensure the seal between the reactor 4 and the walls of the cavities 7.

The beam 1 is pivoted on a roller 10 firmly attached to a fixed horizontal beam 11. A rack 12 moved by a handle 13 allows the inclination of the beam 1 to be controlled with respect to the horizontal.

The block 2 located upstream of the reactor 4 has passing through it a conduit 14 and a conduit 15 which serve respectively to introduce a hydrocarbon in the gaseous state and a carrier gas into the reactor 4.

The block 2 supports an assembly of elements comprising a hopper 16, a lock chamber 17, two spherical valves 18 and 19, an enclosure 20 and a powder distributor 21.

The hopper 16 is located below a silo (not shown) containing a pulverulent solid reagent. It opens into the valve 18 forming the upstream end of the lock chamber 17, the downstream end of which includes the valve 19.

The lock chamber 17 is in communication with two connecting pieces 22 and 23 designed to connect it to an inert gas circuit. The lock chamber 17 is tubular and contains a cylindrical tube 24 of smaller diameter the technical function of which is to prevent the circulation of the inert gas in the lock chamber 17 from interfering with the flow of the pulverulent solid reagent.

The valve 19 opens into the sealed enclosure 20, which includes two connecting pieces 25 and 26 designed to connect it to an inert gas circuit. The inert gas delivered to the lock chamber 17 is preferably the same as that delivered to the enclosure 20.

The enclosure 20 is tubular and contains a cylindrical tube 27 that is similar to the cylindrical tube 24 of the lock chamber 17 and performs the same technical function.

The powder distributor 21 is located directly below the enclosure 20 and is coupled to an electric motor 28. The powder distributor 21 (shown more clearly in FIGS. 2 and 3) includes a horizontal shaft 29 a part of the periphery of which (designated by reference 30 in FIG. 3) has been milled to form one or more troughs 31 therein (FIG. 4). The length of the troughs 31 (in the direction of the axis of the shaft 29) corresponds substantially to the diameter of the enclosure 20. Under the effect of rotation of the shaft 29 the compartments 31 are alternately filled with the powder contained in the enclosure 20 and then discharge said powder by gravity into a collector 34 foamed in the block 2. The shaft 29 includes abutment faces 32 for the mounting of rolling bearings (not shown) and annular grooves 33 designed to contain O-rings (not shown) so that the rotation of the shaft 29 is completely sealed in the block 2.

The motor 28 is of the variable-speed type. Its speed is controlled as a function of the delivery rate desired for the admission of the pulverulent product into the reactor 4.

The collector 34 passes through the upstream block 2 and opens into the reactor 4.

The end block 3 supports a sealed assembly of elements comprising a reservoir 35, a valve 36 of the guillotine type, a lock chamber 37 and a second valve 38 of the guillotine type. The lock chamber 37 is in communication with two connecting pieces 39 and 40 designed to connect it to an inert gas circuit.

The reservoir 35 is open in its upper portion and is in communication with the downstream end of the reactor 4 via a passage (not shown) formed through the block 3. In this way, by actuating the valves 36 and 38, the products produced in the reactor 4 are withdrawn from the installation. To prevent the circulation of the inert gas in the lock chamber 37 from interfering with the flow of the products discharged from the reactor 4, the chamber 37 is given a tubular profile and a cylindrical tube 41 of smaller diameter is arranged in its upper part.

The end block 3 also has passing through it a conduit 44 which opens into the downstream zone of the reactor 4. This conduit 44 is designed to extract at least a portion of the gases from the reactor 4 and send it towards a gas analyser (not shown). The gas analyser is not critical. It may include, for example, a gas-phase chromatograph coupled to a mass spectrometer.

The upstream 2 and downstream 3 blocks each have passing through them an internal circuit of passages 42 designed for the circulation of a cooling fluid, generally water.

A toothed collar 43 is fixed to the metal casing 5 of the reactor 4 and mechanically coupled to the shaft of an electric motor (not shown) so as to subject the reactor 4 to slow and regular rotation.

To manufacture carbon nanotubes by means of the installation shown in the Figures, the oven 6 is heated sufficiently to produce the reaction temperature suitable for the catalytic decomposition of the hydrocarbon in the reactor 4. The cooling water circulating in the passages 42 ensures that the upstream 2 and downstream 3 blocks are maintained at a temperature compatible with their correct mechanical behaviour.

In addition, the lock chambers 17 and 37 and the enclosure 20 are subjected to permanent flushing with an inert gas, for example, nitrogen, by means of the connecting pieces 22 and 23, 39 and 40, 25 and 26 respectively.

A catalyst in powder form is poured into the hopper 16 and the valve 18 is opened, the valve 19 being closed. After filling of the lock chamber 17 the valve 18 is closed and the valve 19 is opened to transfer the catalyst from the lock chamber 17 to the enclosure 20 via the cylindrical conduit 27. After having closed the valve 18 and while the lock chamber 17 is being emptied of the catalytic powder it contains, a new charge of catalyst is introduced into the hopper 16. Once the lock chamber 17 is empty, the valve 19 is closed, the valve 18 is re-opened and the cycle of operations just described is repeated.

The powder catalyst contained in the enclosure 20 flows continuously by gravity towards the reactor 4 through the collector 34. Its delivery rate is controlled by the distributor 21. If the gravity flow is difficult, a spiral pump or vibrating device (not shown) may be added to ensure good transportation of the catalyst between the distributor and the reactor. Since the reactor 4 is slightly inclined from the upstream end (block 2) to the downstream end (block 3) and is also subjected to slow and continuous rotation about its longitudinal axis, the powder catalyst flows therein progressively towards the block 3.

In addition, there are introduced continuously into the reactor 4, firstly, a hydrocarbon (for example, methane) via the conduit 14 and, secondly, a carrier gas (for example, argon, nitrogen, helium or hydrogen) via the conduit 15. In the oven 4 a temperature of approximately 600 to 800° C. is produced so as to decompose the hydrocarbon into carbon and hydrogen. Upon contact with the catalyst, the carbon crystallises, forming graphite nanotubes. The reaction products flow towards the downstream end of the reactor 4 and pass into the reservoir 35. If an adhesion phenomenon occurs, obstructing the flow of products in the reactor, a scraper (not shown) may be used to facilitate the continuous flow of the products. If the flow by gravity is not effected easily in the withdrawal device, an extractor (not shown) may be used to facilitate conveyance between the reactor and the lock chamber 37. As the lock chamber 37 is under inert nitrogen atmosphere its valve 36 is opened to transfer the products from the reservoir 35 thereto. The flushing of the lock chamber 37 with the flow of inert gas (by means of the connecting pieces 39 and 40) has the effect of eliminating substantially the totality of the hydrogen and the hydrocarbons contained in the lock chamber 37.

The valve 38 is opened to recover the carbon nanotubes. The flow of gas emerging from the conduit 44 is also collected and transferred to an analyser (not shown), for example, a gas-phase chromatograph coupled to a mass spectrometer.

During the operation of the installation shown in the Figures the gas admission conduits 14 and 15 may be moved axially so as to deliver the gases to the zone of the oven in which the temperature most appropriate for synthesising carbon nanotubes prevails.

The interest of the invention will be apparent in the course of the description of the following examples.

FIRST SERIES OF EXAMPLES

According to the Invention

Examples 1 to 3 described below deal with trials concerning the synthesis of carbon nanotubes which were carried out in conformity with the method according to the invention in an installation similar to that illustrated in FIGS. 1 to 4.

Example 1

In this example a bed of 0.09 g of catalyst per cm of length of the tubular reactor was placed in the reactor and the reactor was subjected to continuous rotation at 2 rev/min. The reactor was fed with a powder catalyst and the hydrocarbon selected consisted of ethylene diluted in a carrier gas in a proportion of 0.33 mole/l.

A delivery rate of catalyst of 0.006 g/s and a delivery rate of gas (carrier gas charged with ethylene) of 3 Nl/min were used.

A production of 32 g of carbon nanotubes per hour was obtained with a yield of 4.5 g of carbon per g of catalyst.

Example 2

The trial of Example 1 was repeated under the following conditions:
Thickness of catalyst bed: 0.22 g/cm;
Speed of rotation of reactor: 2 rev/min;
Molar titre of ethylene in the carrier gas: 0.50; Delivery rate of catalyst: 0.015 g/s;
Delivery rate of gas: 3 Nl/min.
The following results were obtained:
Production: 48 g/h;
Yield: 4.9 g of carbon per g of catalyst.

Example 3

The trial of Example 1 was repeated under the following conditions:
Thickness of catalyst bed: 0.04 g/cm;
Speed of rotation of reactor: 2 rev/min;
Molar titre of ethylene in the carrier gas: 0.33;
Delivery rate of catalyst: 0.003 g/s;
Delivery rate of gas: 3 Nl/min.
The following results were obtained:
Production: 32 g/h;
Yield: 3.8 g of carbon per g of catalyst

SECOND SERIES OF EXAMPLES

Not According to the Invention

Examples 4 to 6 described below were carried out according to the known discontinuous mode of the CCVD method. In these examples the same catalyst was used as in the first series of examples 1 to 3.

Example 4

In this example a permanent catalyst bed of 2.0 g distributed over a length of 20 cm was produced in a horizontal tubular reactor.

The hydrocarbon chosen consisted of ethylene diluted in a carrier gas in a proportion of 0.33 mole/l, as in the first series of examples. This gas was circulated in the reactor for 20 minutes at a flow rate of 3 Nl/min.

A production of 6.8 g of carbon nanotubes per hour was obtained with a yield of 1.7 g of carbon per g of catalyst.

Example 5

The trial of Example 4 was repeated under the following conditions:

Length of permanent catalyst bed: 20 cm;
Mass of permanent catalyst bed: 0.8 g;
Molar titre of ethylene in the carrier gas: 0.33;
Delivery rate of gas: 3 Nl/min;
Duration of discontinuous trial: 20 min.
The following results were obtained:
Production: 3.4 g/h;
Yield: 2.1 g of carbon per g of catalyst.

Example 6

The trial of Example 4 was repeated under the following conditions:
Length of permanent catalyst bed: 20 cm;
Mass of permanent catalyst bed: 1.6 g;
Molar titre of ethylene in the carrier gas: 0.33;
Delivery rate of gas: 3 Nl/min;
Duration of discontinuous trial: 20 min.
The following results were obtained:
Production: 7.4 g/h;
Yield: 2.3 g of carbon per g of catalyst.

A comparison of the results of Examples 1 to 3 (according to the invention) with those of Examples 4 to 6 (according to the discontinuous process prior to the invention) makes the advantage of the invention regarding productivity and yield of the synthesis of carbon nanotubes immediately apparent.

The invention claimed is:

1. An installation for the production of carbon nanotubes, comprising:
    a tubular reactor inclined relative to a horizontal surface;
    a first device for admitting a gaseous reagent to the reactor;
    a second device for charging the reactor with a pulverulent catalyst, the second device comprises a first lock chamber isolated by two valves and provided with connections to an inert gas circuit;
    a third device for withdrawing the carbon nanotubes and the pulverulent catalyst from the reactor, the third device comprises a second lock chamber isolated by two valves and provided with connections to an inert gas circuit; and
    a device for heating the gaseous reagent and catalyst in the reactor;
    wherein the first and second lock chambers provide an inert atmosphere in the reactor from a point of admitting the gaseous reagent and charging of the pulverulent catalyst to a point of withdrawing the carbon nanotubes and the pulverulent catalyst; and
    wherein the heating device comprises an oven that houses the reactor.

2. An installation according to claim 1, wherein the heating device is located outside of the reactor.

3. An installation according to claim 1, wherein the heating device provides a temperature from 500° C. to 1200° C. inside the reactor.

4. An installation according to claim 1, wherein the first device and the second device independently open into the reactor.

5. An installation according to claim 1, wherein the second device includes a distributor of the pulverulent catalyst.

6. An installation according to claim 1, wherein the first device admits the gaseous reagent into the reactor via a first conduit.

7. An installation according to claim 6, wherein the first device further comprises a second conduit for the admission of an inert carrier gas into the reactor.

8. An installation according to claim 7, wherein the first conduit and second conduit can be moved axially to admit the gaseous reagent and the inert carrier gas into different zones of the reactor.

9. An installation according to claim 1, wherein the reactor is made of quartz.

10. An installation for the production of carbon nanotubes, comprising:
- a tubular reactor inclined relative to a horizontal surface;
- a first device for admitting a gaseous reagent to the reactor;
- a second device for charging the reactor with a pulverulent catalyst, the second device comprises a first lock chamber isolated by two valves and provided with connections to an inert gas circuit;
- a third device for withdrawing the carbon nanotubes and the pulverulent catalyst from the reactor, the third device comprises a second lock chamber isolated by two valves and provided with connections to an inert gas circuit;
- a device for heating the gaseous reagent and catalyst in the reactor;
- wherein the first and second lock chambers provide an inert atmosphere in the reactor from a point of admitting the gaseous reagent and charging of the pulverulent catalyst to a point of withdrawing the carbon nanotubes and the pulverulent catalyst; and
- wherein the reactor is made of alumina or steel coated with a protective layer of a refractory material.

11. An installation for the production of carbon nanotubes comprising:
- i) a tubular reactor inclined relative to a horizontal surface on which said tubular reactor is located,
- ii) a first device in connection with the reactor for admitting a gaseous reagent to the reactor,
- iii) a second device in connection with the reactor for charging the reactor with a pulverulent catalyst,
- iv) a third device in connection with the reactor for withdrawing the carbon nanotubes from the reactor, and
- v) a fourth device surrounding at least a part of the reactor for heating the reactor,
- vi) wherein the second device includes a) a lock chamber isolated by two valves and provided with connections to an inert gas circuit, the lock chamber in connection with a hopper via one of the two valves and with an enclosure via the other of the two valves, and b) a powder distributor, the powder distributor in connection with the enclosure such that the pulverulent catalyst is discharged into the reactor by gravity, and the powder distributor controlling a feed rate of the pulverulent catalyst to the reactor,
- vii) wherein the third device includes another lock chamber isolated by two valves and provided with connections to an inert gas circuit,
- viii) wherein the first device and the second device have openings into the reactor; and
- ix) wherein the fourth device comprises an oven that houses the reactor.

12. The installation of claim 11, wherein the lock chamber of the second device is tubular and includes a cylindrical tube having a smaller diameter than a diameter of the lock chamber, the cylindrical tube preventing a flow of an inert gas entering the lock chamber via the inert gas circuit from interfering with the flow of the pulverulent product.

13. An installation according to claim 11, wherein the heating device provides a temperature from 500° C. to 1200° C. inside the reactor.

14. An installation according to claim 11, wherein the first device and the second device independently open into the reactor.

15. An installation according to claim 11, wherein the first device admits the gaseous reagent into the reactor via a first conduit.

16. An installation according to claim 15, wherein the first device further comprises a second conduit for the admission of an inert carrier gas into the reactor.

17. An installation according to claim 16, wherein the first conduit and second conduit can be moved axially to admit the gaseous reagent and the inert carrier gas into different zones of the reactor.

* * * * *